J. T. JONES.

ORE SMELTING FURNACE.

APPLICATION FILED JAN. 8, 1909.

Reissued Mar. 16, 1909.

12,928.

3 SHEETS—SHEET 1.

Witnesses:
John Enders
Chas. H. Bull.

Inventor:
John T. Jones,
By Dyer, Firth, Lee & Christy & Miller
Attys.

J. T. JONES.
ORE SMELTING FURNACE.
APPLICATION FILED JAN. 8, 1909.
Reissued Mar. 16, 1909.
12,928.
3 SHEETS—SHEET 2.
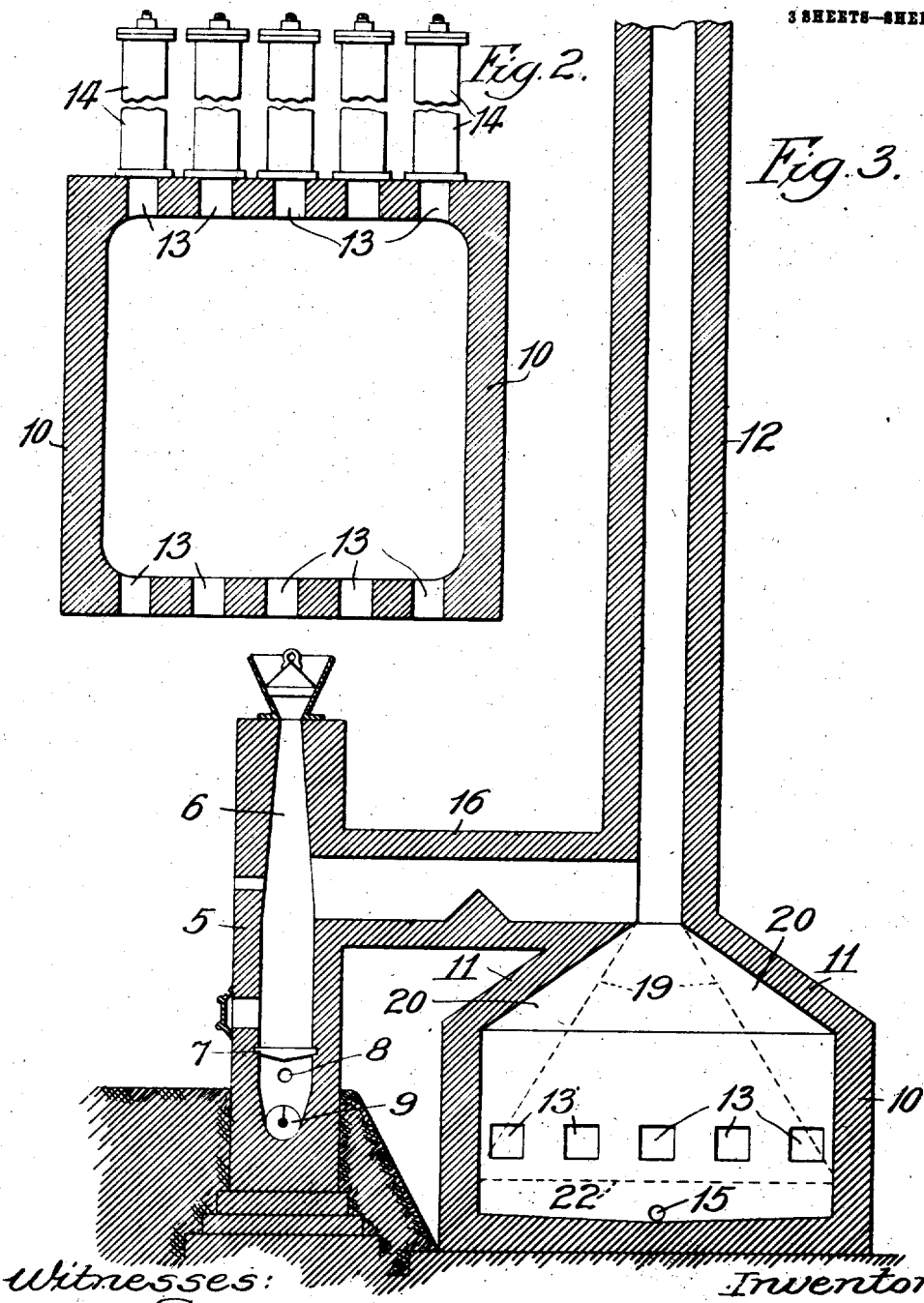
Witnesses:
John Enders
Chas. H. Buell
Inventor:
John T. Jones,
By Dyrenforth, Lee, Chritton & Wilder
Attys.

J. T. JONES.

ORE SMELTING FURNACE.

APPLICATION FILED JAN. 8, 1909.

Reissued Mar. 16, 1909.

12,928.

3 SHEETS—SHEET 3.

Witnesses:
John Enders
Chas. H. Buell.

Inventor:
John T. Jones,
By Dyrenforth, Lee, Christon & Miles
Attys.

UNITED STATES PATENT OFFICE.

JOHN T. JONES, OF IRON MOUNTAIN, MICHIGAN, ASSIGNOR, BY DIRECT AND MESNE ASSIGNMENTS, TO JONES STEP-PROCESS COMPANY, A CORPORATION OF MINNESOTA.

ORE-SMELTING FURNACE.

No. 12,928. Specification of Reissued Letters Patent. Reissued March 16, 1909.

Original No. 890,232, dated June 9, 1908, Serial No. 407,772. Application for reissue filed January 8, 1909. Serial No. 471,365.

*To all whom it may concern:*

Be it known that I, JOHN T. JONES, a citizen of the United States, residing at Iron Mountain, in the county of Dickinson and State of Michigan, have invented a new and useful Improvement in Ore-Smelting Furnaces, of which the following is a specification.

The primary object of my invention is to provide a novel construction of furnace, on the order of that forming the subject of United States Patent No. 866,280, granted to me September 17, 1907, whereby it shall be adapted, more especially, to perform a semi-smelting action, in the sense of melting the slag-making constituents of the ore, while reducing without melting the metal constituents thereof. The iron ore, for example, which my present furnace is adapted to treat would contain slag-making constituents which would become fluid when raised to a temperature of say not over 2300° F., a temperature below that necessary to melt the reduced iron constituents of the ore.

Figure 1:
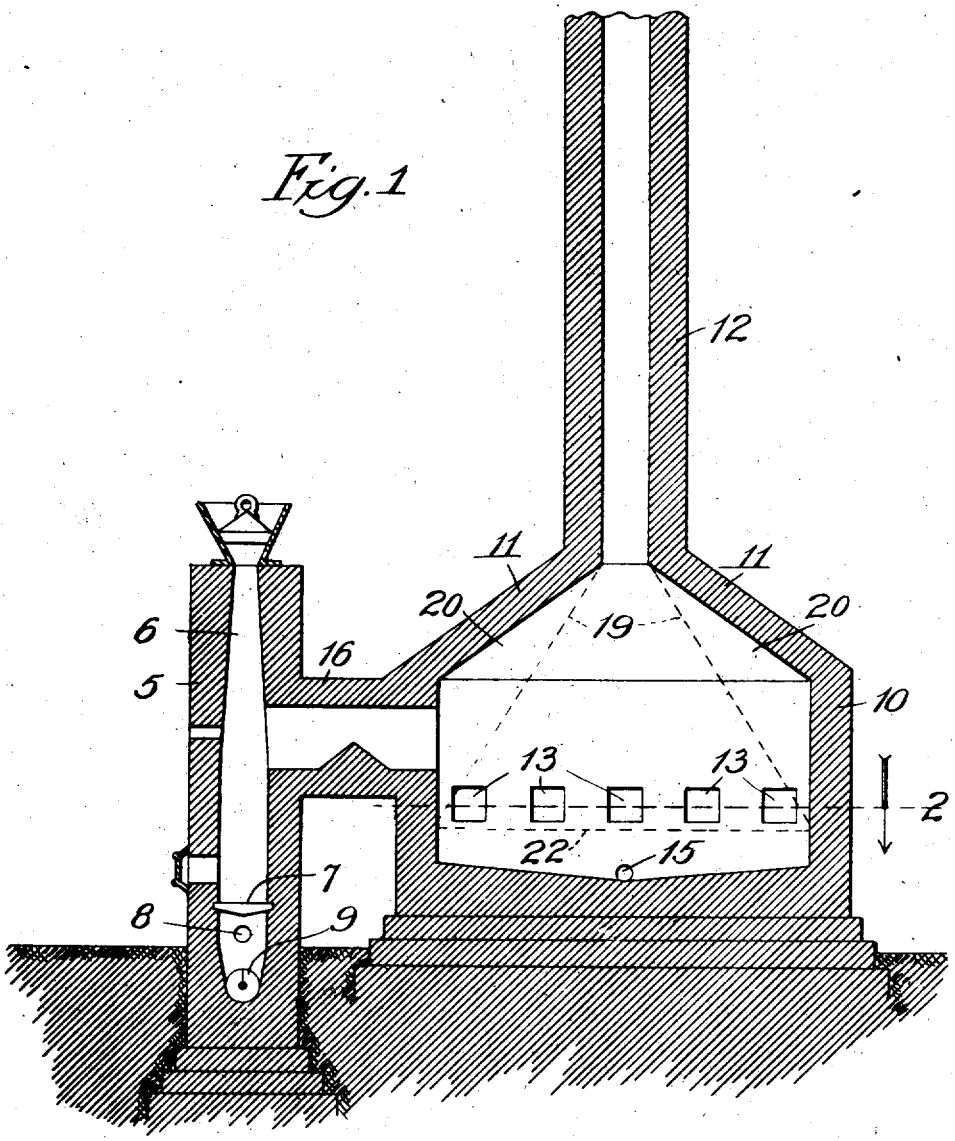
Figure 4:
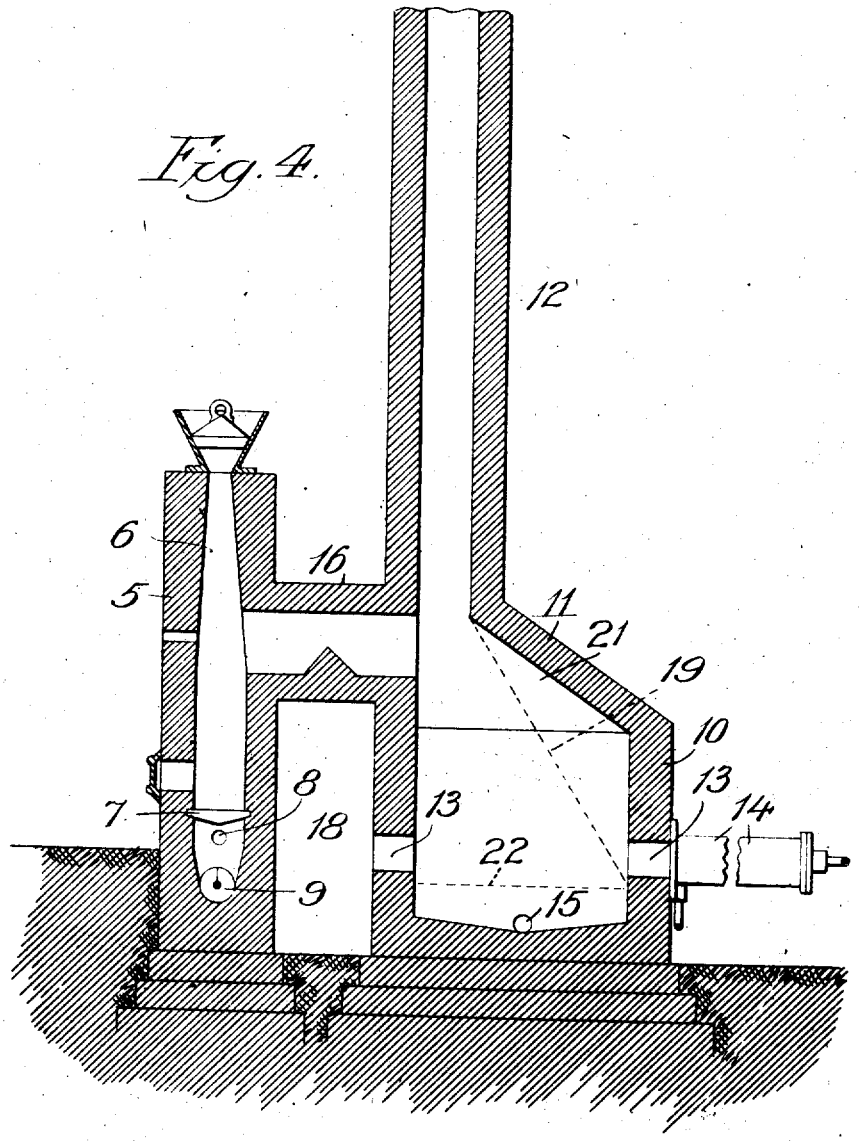

In the accompanying drawing, Figure 1 shows my improved furnace by a view in vertical sectional elevation, with the upper portion of the ore-stack or reducing-kiln broken away; Fig. 2 is a section taken on line 2 in Fig. 1; and Figs. 3 and 4 are views like that presented in Fig. 1 but showing different modifications of the structure.

Referring more particularly to Fig. 1: a coal-burning furnace of or lined with suitable refractory brick, as the magnesite variety thereof, is represented at 5 as extending from below the ground level to a height of about twenty-five feet, more or less, above the same, and containing a fuel chamber 6, the desired diameter of which is about two feet, for burning, as the preferred fuel, soft coal, on a grate 7 above an air-blast inlet 8 below which is indicated a rotary conveyer 9 for removing the ashes. A chamber 10 of relatively large proportions, and also formed or lined with such brick, is erected on a substantial foundation adjacent to the furnace 5 and is provided with a sloping roof 11, from the apex of which the ore-stack or kiln 12, likewise formed of or lined with such brick, extends to a height or distance of, say, 100 feet, more or less. In opposite walls of the chamber are formed ram-openings 13 to the desired number, each opening alining with one in the opposite chamber wall to permit rams, indicated at 14, to be provided on one wall and adapted to be reciprocated by hydraulic or other suitable power, for working them through the openings, for the purpose hereinafter explained. Below the openings 13 and just above the chamber bottom, which should slightly incline downwardly toward its longitudinal center, as represented, is provided a tap-hole 15. A flue-neck 16 connects the furnace chamber 6, from between its ends, and preferably from about midway between them, with the adjacent side of the chamber. This neck is, by preference but not necessarily, composed of solid carbonaceous material, as graphite in block form, or a mixture of pulverized graphitic carbon, in the proportion of about 10 per cent. and pulverized coke in the proportion of about 90 per cent., with a sufficient quantity of binding material, such as coal-tar, the mixture being compacted to solid form by hydraulic or other pressure and then hardened by baking. This material renders the flue proof against destruction under the heat to which it is subjected from the burning gases which pass through it to the exclusion of air. The construction illustrated in Fig. 3 differs from that presented in Fig. 1 only in placing the base of the chamber 10 below that of the furnace 5 and running the flue into it at its junction with the lower end of the stack; and the construction shown in Fig. 4 differs from that presented in Fig. 1 in extending the stack immediately over the inner end of the flue 16 and forming a chamber with its inner wall flush with the corresponding side of the stack and thus with the roof 11 sloping only toward the outer wall containing the openings 13 which are equipped with the ram devices 14 and aline with the similar openings 13 in the opposite wall, which lead to an area 18 between the chamber 10 and the furnace 5.

To operate this smelting furnace, the procedure is as follows: The stack or kiln 12 is charged with the ore to be partially melted, in a finely pulverized condition mixed with suitable refractory material, preferably coke, in lump form to render the column of material which is supplied to the stack through its upper end interstitial throughout and non-packing to facilitate the passage through it of the hot gases from the burning fuel in the furnace 5, which reach the ore-column through the flue 16 and escape at the top of the stack. The lower end of the column of material to be acted on will spread out into the downwardly-flaring shape indicated by the dotted lines at 19 in Figs. 1 and 3, forming about it the space 20, or into the downwardly-flaring shape indicated by dotted lines at 19 in Fig. 4 forming the space 21 at the outer side of the base of the ore-column. The reducing gases from the furnace 5 pass through the flue 16 directly into the space 20, near the base thereof in the construction according to Fig. 1, passing around and through the expanded base of the ore-column and rising therein and passing through the ore in the stack or kiln to reduce the metallic oxids to metal. My intention is, in practice, to cause the temperature in the lower part of the chamber 10 to be sufficiently high to melt a large proportion of the slag-making constituents of the ore. In the construction according to Figs. 3 and 4, the hot gases enter from the flue immediately into the lower end of the stack to rise through the interstitial column of ore therein, part of the gases descending into the space 20 or the space 21, as the case may be, and thence permeating and attacking the expanded base of the ore-column. The space adjacent to the ore-column base in the chamber 10 renders it a combustion-enhancing chamber for the gases to augment the intensity of their heat and the intensity of their action on the ore which should be sufficient to melt at least a large proportion of the slag-making constituents of the ore, but not the reduced metal. The molten slag may be accumulated as a bath and may reach a depth indicated by the dotted line 22 in the chamber 10, whence it may be tapped off from time to time, through the opening 15. As slag-making constituents are melted out of the mass in the expanded base of the column, the unmelted part of the ore requires to be removed, to be replaced by gravity with ore from the stack. To effect this the ram-devices 14 are actuated from time to time to reciprocate through the column base and force the unmelted material ahead of them through the discharge-openings 13. The metal may then be separated, as by crushing and screening the material thus discharged, or otherwise.

What I claim as new and desire to secure by Letters Patent is—

1. In an ore-smelting furnace, the combination of a carbonaceous-fuel-burning furnace, an ore-stack, a chamber beneath and of greater cross-sectional dimensions than the stack, said chamber having a roof from which the stack rises and through which it discharges into the chamber, and a flue-forming neck leading from said fuel-furnace, at a point about midway between its upper and lower ends, into said chamber and stack near their junction, for the purpose set forth.

2. In an ore-smelting furnace, the combination of a carbonaceous-fuel-burning furnace, an ore-stack, a chamber beneath and of greater cross-sectional dimensions than the stack, said chamber having a sloping roof from which the stack rises and through which it discharges into the chamber, and a flue-forming neck of solid carbonaceous material leading from said fuel-furnace into said chamber and stack near their junction, for the purpose set forth.

3. In an ore-smelting furnace, the combination of a carbonaceous-fuel-burning furnace, an ore-stack, a chamber beneath and of greater cross-sectional dimensions than the stack, said chamber having a roof from which the stack rises and through which it discharges into the chamber, and a flue-forming neck of solid carbonaceous material leading from said fuel-furnace, at a point about midway between its upper and lower ends, into said chamber and stack near their junction, for the purpose set forth.

4. In an ore-smelting furnace, the combination of a carbonaceous-fuel-burning furnace, an ore-stack, a chamber beneath and of greater cross-sectional dimensions than the stack, said chamber having a roof from which the stack rises and through which it discharges into the chamber, openings in opposite walls of said chamber and ram-devices working in said openings, and a flue-connection between the fuel-furnace and said chamber and stack near their junction, for the purpose set forth.

5. In an ore-smelting furnace, the combination of a carbonaceous-fuel-burning furnace, an ore-stack, a chamber beneath and of greater cross-sectional dimensions than the stack, said chamber having a roof from which the stack rises and through which it discharges into the chamber, openings in opposite walls of said chamber and ram-devices working in said openings, and a flue-forming neck of solid carbonaceous material connecting said fuel-furnace from a point about midway between its ends with said chamber near its junction with the stack, for the purpose set forth.

JOHN T. JONES.

In presence of—
C. T. WINEGAR,
C. G. JONES.